US009423575B2

(12) United States Patent
Yang et al.

(10) Patent No.: US 9,423,575 B2
(45) Date of Patent: Aug. 23, 2016

(54) SMALL FORM-FACTOR PLUGGABLE CONNECTOR

(71) Applicant: Teralux Technology Co., Ltd., Kunshan, Jiangsu Province (CN)

(72) Inventors: Hsin Chih Yang, Kunshan (CN); Wei Chen, Kunshan (CN); Jin Hua Meng, Kunshan (CN)

(73) Assignee: Teralux Technology Co., Ltd. (CN)

( * ) Notice: Subject to any disclaimer, the term of this patent is extended or adjusted under 35 U.S.C. 154(b) by 0 days.

(21) Appl. No.: 14/809,929

(22) Filed: Jul. 27, 2015

(65) Prior Publication Data

US 2016/0216460 A1 Jul. 28, 2016

(30) Foreign Application Priority Data

Jan. 23, 2015 (CN) .................... 2015 2 0046309 U

(51) Int. Cl.
G02B 6/36 (2006.01)
G02B 6/38 (2006.01)
G02B 6/42 (2006.01)

(52) U.S. Cl.
CPC ........... *G02B 6/3893* (2013.01); *G02B 6/3825* (2013.01); *G02B 6/4284* (2013.01); *G02B 6/3897* (2013.01); *G02B 6/4201* (2013.01); *G02B 6/428* (2013.01)

(58) Field of Classification Search
CPC  G02B 6/3893; G02B 6/3825; G02B 6/4284; G02B 6/428; G02B 6/3897; G02B 6/4201
USPC ......... 385/53, 56, 58–60, 71–73, 75–77, 88, 385/92–94; 398/135, 138–139
See application file for complete search history.

(56) References Cited

U.S. PATENT DOCUMENTS

| | | | | |
|---|---|---|---|---|
| 6,692,159 B2 * | 2/2004 | Chiu | ................... | G02B 6/3825 385/53 |
| 6,943,854 B2 * | 9/2005 | Chiu | ................... | G02B 6/3825 349/53 |
| 7,089,948 B2 * | 8/2006 | DeBoer | ............... | A47L 15/4259 134/200 |
| 8,035,975 B2 * | 10/2011 | Wu | .................... | H01R 13/6335 361/727 |
| 8,064,207 B2 * | 11/2011 | Wu | ........................ | G06K 13/08 361/726 |
| 8,113,723 B2 * | 2/2012 | Togami | ................ | G02B 6/4246 385/53 |
| 8,292,518 B2 * | 10/2012 | Togami | ................ | G02B 6/4246 385/53 |
| 8,391,667 B2 * | 3/2013 | Teo | .................... | H01R 13/6272 297/197 |
| 8,790,022 B2 * | 7/2014 | Yi | ........................ | G02B 6/4284 385/89 |
| 2002/0150343 A1 * | 10/2002 | Chiu | ................... | G02B 6/3825 385/53 |
| 2003/0133665 A1 * | 7/2003 | Chiu | ................... | G02B 3/3825 385/53 |

(Continued)

*Primary Examiner* — Ryan Lepisto
*Assistant Examiner* — Guy Anderson
(74) *Attorney, Agent, or Firm* — Roger D. Emerson; Emerson Thomson & Bennett, LLC

(57) ABSTRACT

A small form-factor pluggable connector is disclosed. A locking and unlocking mechanism of the SFP connector includes a rotating member rotatable mounted on a cover, a fastening shaft pivoting the rotating member on the cover, a spring member providing an elastic force for locking and unlocking, an actuator slideably mounted on the cover, and an U-shaped connecting member connecting the rotating member and the actuator. The spring member is located under a latching arm of the rotating member. When the latching arm is forced to rotate downward under an external force, the spring member is compressed. When the external force is removed, the spring member can be restored to its original state and push the latching arm upward. The SFP connector of the present invention is easy to be operated and can efficiently realize the locking and unlocking functions.

10 Claims, 6 Drawing Sheets

(56) References Cited

U.S. PATENT DOCUMENTS

2010/0091466 A1* 4/2010 Wu .................. G06K 13/08
  361/747

2010/0091467 A1* 4/2010 Wu .................. H01R 13/6658
  361/747

* cited by examiner

SMALL FORM-FACTOR PLUGGABLE CONNECTOR

BACKGROUND OF THE INVENTION

1. Field of the Invention

The present invention relates to a plug connector and more particularly to a small form-factor pluggable connector.

2. Description of the Prior Art

A small form-factor pluggable (SFP) connector is used in a common high-speed direct attach cable and a high-speed optical fiber cable. Generally, the SFP connector disposes a locking mechanism. When the SFP connector needs to be connected to a receptacle connector, the SFP connector is firstly inserted into a shielding case and is fixed in the shielding case by the locking mechanism, thereby ensuring the connection safety between the SFP connector and the receptacle connector. When needing to disconnect the SFP connector from the receptacle connector, the SFP connector is firstly detached from the shielding case by an unlocking mechanism, so the SFP connector can be fast pulled out from the receptacle connector.

However, the connector is becoming smaller and smaller, and the intensive degree of the receptacle connector in an electronic equipment is gradually increased. Therefore, the mechanism attaching or detaching the SFP connector from the shielding case becomes more complex, and the operation thereof also becomes more difficult.

Hence, it is necessary to provide a new SFP connector to simplify the lock and unlocking mechanism and further simplify the operation thereof.

BRIEF SUMMARY OF THE INVENTION

An object of the present invention is to provide a small form-factor pluggable connector, which can be efficiently locked and unlocked, and the locking and unlocking operation of which is extremely convenient and fast.

To achieve the above object or other objects of the present invention, the present invention adopts the following technical solution.

The present invention provides a small form-factor pluggable connector, comprising a base, a cover and a locking and unlocking mechanism. The cover is mounted on the base and having a top surface, which forms a concave chamber and a retaining passage located in rear of the concave chamber. The retaining passage forms a through hole, which is located on two sides of the retaining passage and passes through two sides of the cover. The locking and unlocking mechanism includes a rotating member, a fastening shaft, a spring member, an actuator and an U-shaped connecting member. The rotating member is rotatable mounted on the cover. The rotating member has a main body received in the retaining passage, a shaft hole formed on the main body and passing through two sides of the main body, a latching arm located in front of the shaft hole and extending forward from a front surface of the main body into the concave chamber, a hook disposed on the top of the latching arm and protruding out of the concave chamber, and an inner concave portion located in rear of the shaft hole and formed on a bottom surface of the main body. The fastening shaft is inserted into the through hole of the cover and the shaft hole of the rotating member, and the rotating member is pivoted on the cover by the fastening shaft. The spring member is used to provide an elastic force for locking and unlocking. The spring member is mounted on the concave chamber of the cover and located under the latching arm of the rotating member. When the latching arm is forced to rotate downward under an external force, the spring member is compressed. And when the external force is removed, the spring member is restored to an initial state and lifts the latching arm. The actuator is slideably mounted on the cover and comprises a first portion and a second portion. The first portion is mounted in the retaining passage and is inserted between the main body of the rotating member and the bottom of the retaining passage. And the second portion extends backward from the first portion and is used to pulling the first portion backward. The U-shaped connecting member is used to connect the actuator and the rotating member. The U-shaped connecting member has two free edges, one free edge of which is rotatable fixed on the first portion of the actuator, and the other free edge of which leans on the inner concave portion of the rotating member.

In one embodiment, the retaining passage disposes a block on the bottom of the retaining passage. The main body of the rotating member forms a notch engaged with the block. The first portion of the actuator forms an opening receiving the block. And the length of the block is greater than that of the block.

In one embodiment, the top surface of the cover has a first surface in the front thereof and a second surface in the rear thereof. The second surface is higher than the first surface. There forms a shoulder between the first and second surfaces. The concave chamber is formed on the first surface and next to the shoulder. The retaining passage is formed on the second surface and passes through the shoulder and a rear surface of the cover. The bottom of the concave chamber is tilted upward to the bottom of the retaining passage. The through hole is adjacent to the shoulder and is divided into two parts by the retaining passage. And the concave chamber disposes a spring receiving recess on the bottom thereof.

In one embodiment, the main body further disposes a protrusion on the bottom of the latching arm. The inner concave portion has a tilted front sidewall and an upright rear sidewall.

In one embodiment, the spring member is a cylinder spring, a top end is set on the protrusion of the latching arm, and a bottom end of which is placed in the spring receiving recess.

In one embodiment, the first portion disposes a hump on the top thereof; the hump is held in the inner concave portion of the rotating member and forms a retaining hole thereon.

In one embodiment, the one free edge of the U-shaped connecting member is rotatable fixed in the retaining hole of the actuator, and the other free edge thereof leans on the rear sidewall of the inner concave portion of the rotating member.

In one embodiment, the U-shaped connecting member is a U-shaped ring.

In one embodiment, a top surface of the main body is planar, but the bottom surface of the main body is ladder-shaped. When the rotating member is mounted on the cover, the top surface of the main body is align with the second surface of the cover.

In one embodiment, the small form-factor pluggable connector further comprises a grounding shell surrounding and being fixed on the base and the cover. The grounding shell is located next to the shoulder, and forms a plurality of elastic pieces being bent outward and extending toward the shoulder on the rear of the grounding shell.

In comparison with the prior art, the connector with a lock and unlock mechanism of the present invention can be efficiently locked in a shielding case by disposing the vertical stop wall on the case, can be efficiently unlocked by the bending end of the unlocking member, and can be restored to the initial state under the function of the spring member. It can be seen that the locking and unlocking way of the connector is very convenient and fast.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "top", "bottom", "front", "back", "left", "right", "top", "bottom" etc., are only used with reference to the orientation of the accompanying drawings. For example, the following description may refer to the orientation of FIG. 1. Therefore, the used directional terms are intended to illustrate, but not to limit, the present invention.

Figure 1:
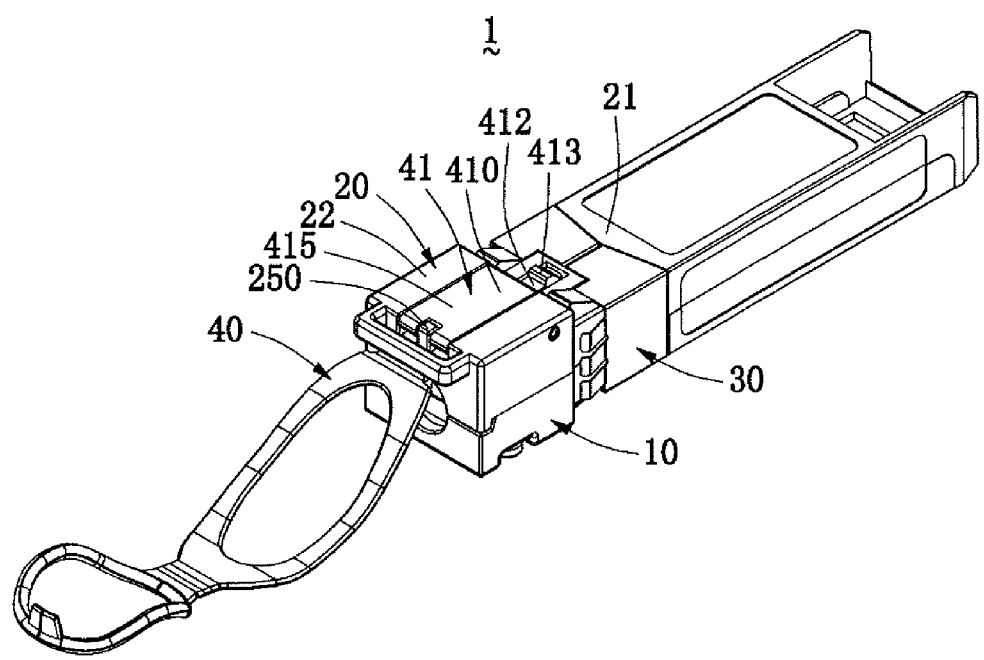
FIG. 1 is a perspective schematic view of a SFP connector of the present invention.
Figure 2:
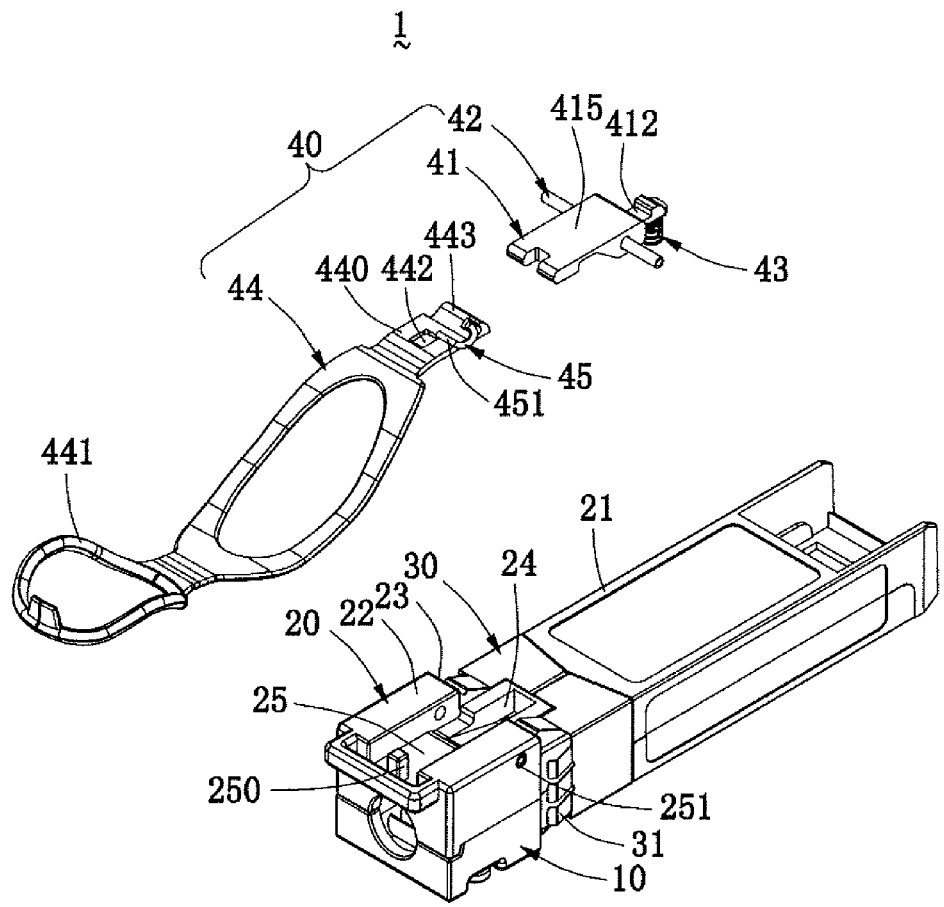
FIG. 2 is an exploded view of the SFP connector of the present invention, wherein a lock and unlocking mechanism is disassembled from a cover and a base.

Please refer to FIGS. 1 and 2, a small form-factor pluggable (SFP) connector 1 mainly comprises a base 10, a cover 20 mounted on the base 10, a grounding shell 30 surrounding and being fixed on the base 10 and the cover 20, and a locking and unlocking mechanism 40 mounted on the cover 20.

Referring to FIG. 2, the cover 20 has a first surface 21 next to a front end and a second surface 22 next to a rear end. The second surface 22 is higher than the first surface 21, so there forms a shoulder 23 between the first surface 21 and the second surface 22. In the embodiment, the first surface 21 and the second surface 22 constitute a top surface of the cover 20, and the SFP connector 1 is divided into a front portion and a rear portion by the first surface 21 and the second surface 22. Generally, the front portion having the first surface 21 can be inserted into a shielding case 9 shown in FIG. 6 for being connected with a receptacle connector (now shown), and the rear portion having the second surface 22 is exposed to the outside of the shielding case 9. The grounding shell 30 surrounds the front portion of the SFP connector 1 and is located next to the shoulder 23. The grounding shell 30 forms a plurality of elastic pieces 31 being bent outward and extending toward the shoulder 23. When the SFP connector 1 is inserted into the shielding case 9 shown in FIG. 6, the elastic pieces 31 of the grounding shell 30 can elastically contact with an inner wall of the shielding case 9 to form a complete grounding path.

Referring to FIG. 2, the cover 20 forms a rectangular concave chamber 24 on the first surface 21 and next to the shoulder 23 for being used to receive one part of the locking and unlocking mechanism 40. The cover 20 also forms a retaining passage 25, which is formed on the second surface 22 and passes through the shoulder 23 and a rear surface of the cover 20. The retaining passage 25 and the concave chamber 24 are located on a centre line along the length direction of the cover 20, and the retaining passage 25 and the concave chamber 24 are connected together. The retaining passage 25 is used to hold the other part of the locking and unlocking mechanism 40. Specifically, the concave chamber 24 forms a spring receiving recess 240 (shown in FIG. 5) on the bottom of the concave chamber 24. The bottom of the concave chamber 24 is tilted upward to the bottom of the retaining passage 25. The retaining passage 25 disposes a block 250 on the rear of the bottom thereof. In the embodiment, the concave chamber 24 and the retaining passage 25 are formed on the top surface of the cover 20.

Moreover, as shown in FIG. 2, there forms a through hole 251 located on two sides of the retaining passage 25 and passing through two sides of the cover 20. The through hole 251 is adjacent to the shoulder 23 and is divided into two parts by the retaining passage 25.

Figure 3:
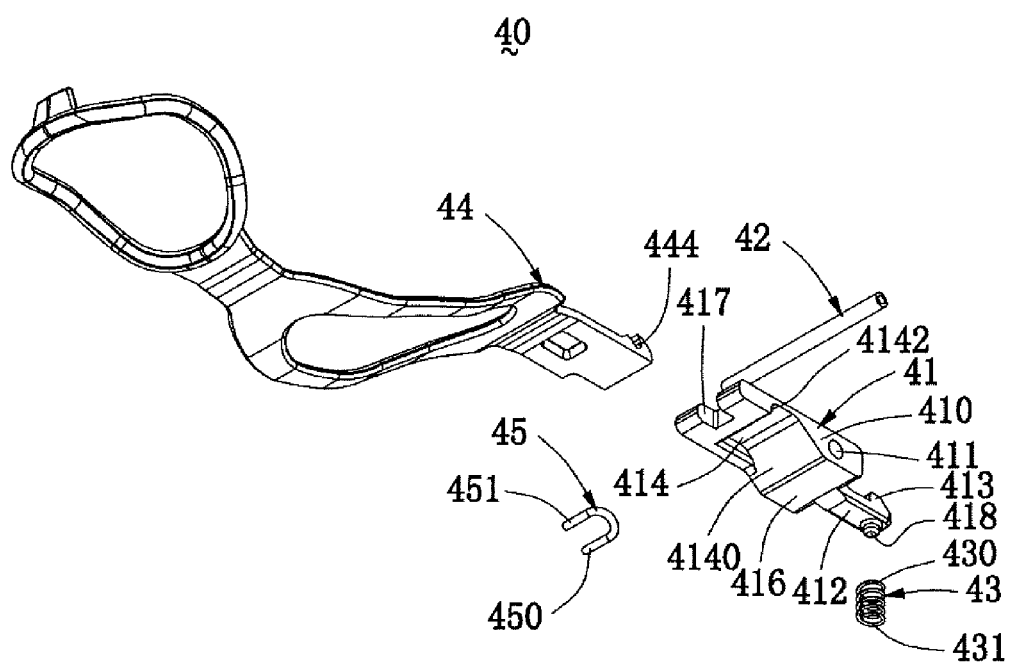
FIG. 3 is an exploded view of the lock and unlocking mechanism, and shows detail structures of every component of the lock and unlocking mechanism.
Figure 4:
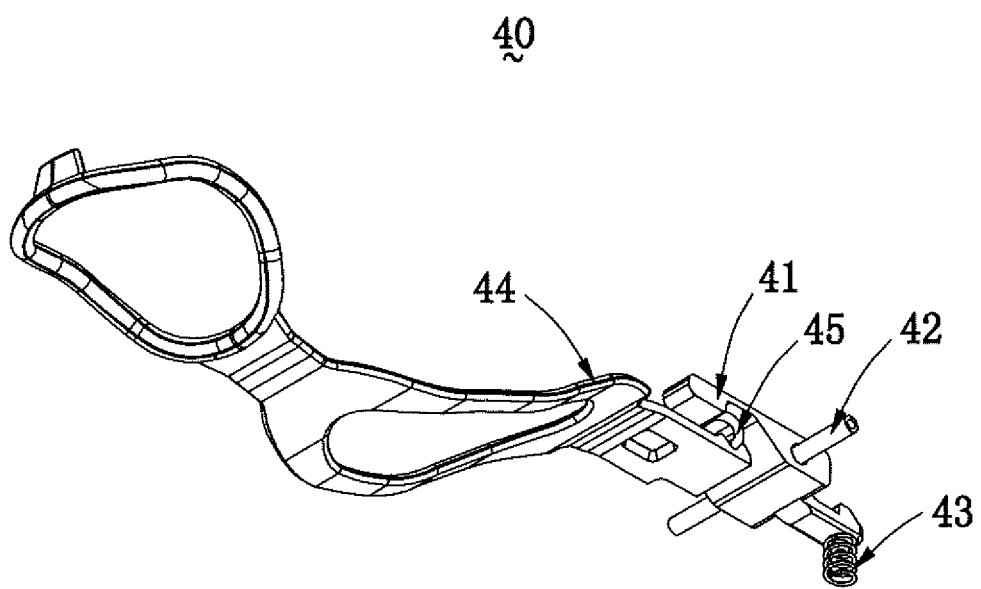
FIG. 4 is a perspective schematic view of the lock and unlocking mechanism after assembled together.

Please refer to FIGS. 2, 3 and 4, the locking and unlocking mechanism 40 includes a rotating member 41, a fastening shaft 42, a spring member 43, an actuator 44 and an U-shaped connecting member 45.

Referring to FIG. 3, the rotating member 41 can be rotatable mounted on the cover 20 shown by FIG. 2. The rotating member 41 has a main body 410, a shaft hole 411 formed on the main body 410 and passing through two sides of the main body 410, a latching arm 412 located in front of the shaft hole 411 and protruding forward from a front surface of the main body 410, a hook 413 disposed on the top of the latching arm 412, and an inner concave portion 414 located in rear of the shaft hole 411 and formed on a bottom surface 416 of the main body 410. In the embodiment, a top surface 415 (shown in FIG. 2) of the main body 410 is planar, but the bottom surface 416 thereof is ladder-shaped and uneven. The main body 410 also forms a notch 417 on the rear thereof to be engaged with the block 250 within the retaining passage 25. The main body 410 further disposes a protrusion 418 on the bottom of the latching arm 412. The inner concave portion 414 has a tilted front sidewall 4140 and an upright rear sidewall 4142.

Please refer to FIGS. 1 and 3, when the rotating member 41 is mounted on the cover 20, the main body 410 can be just received in the retaining passage 25 of the cover 20, the top surface 415 of the main body 410 is horizontal to the second surface 22 of the cover 20, the shaft hole 411 is aligned with the through hole 251 of the cover 20, the latching arm 412 and the protrusion 418 enter into the concave chamber 24 of the cover 20, the hook 413 on the top of the latching arm 412 is located outside of the concave chamber 24 and protrudes out of the first surface 21 of the cover 20, and the notch 417 on the rear of the main body 410 is just engaged with the block 150.

Please refer to FIGS. 2 and 3, the fastening shaft 42 can be inserted into the through hole 251 of the cover 20 and the shaft hole 411 of the rotating member 41, so the rotating member 41 can be pivoted on the cover 20.

Please refer to FIGS. 2 and 3, the spring member 43 is located in the concave chamber 24 of the cover 20 and mounted under the latching arm 412 of the rotating member 41 to provide an elastic force for locking and unlocking. Specifically, the spring member 43 is placed into the spring receiving recess 240 (shown in FIG. 5) of the cover 20. When the latching arm 412 is forced to rotate downward under an external force, the spring member 43 will be compressed. And when the external force is removed, the spring member 43 will be restored to an initial state and lift the latching arm 412 upward. In detail, usually, the spring member 43 is in a free extension state, and the hook 413 on the latching arm 412 protrudes out of the first surface 21 (shown in FIG. 1) of the cover 20. When the SFP connector 1 enters into the shielding case 9 (shown in FIG. 6), the hook 413 will be pressed downward by the inner wall of the shielding case 9. But the spring member 43 is located under the latching arm 412, and the latching arm 412 can compress the spring member 43 downward, so the hook 413 can move downward together with the spring member 43 to smoothly enter into the shielding case 9. After the SFP connector 1 completely enters into the shielding case 9, the hook 413 can automatically enter into a holding hole 90 of the shielding case 9. Therefore, the SFP connector 1 can be fixed in the shielding case 9 and be prevented from leaving away the shielding case 9.

In the embodiment, referring to FIG. 3, the spring member 43 is a cylinder spring, a top end 430 of which is set on the protrusion 418 of the latching arm 412, and a bottom end 431 of which is placed in the spring receiving recess 240 (shown in FIG. 5) of the cover 20.

Please refer FIG. 2, the actuator 44 can be slideably mounted on the cover 20 and includes a first portion 440 and a second portion 441. The first portion 440 is mounted in the retaining passage 25 of the cover 20 and is inserted between the main body 410 and the bottom of the retaining passage 25. The second portion 441 extends backward from the first portion 440 to form a long drawstring for pulling the first portion 440 backward during locking. In the embodiment, the first portion 440 forms an opening 442 engaged with the block 250. The length of the opening 442 is greater than that of the block 250, and the widths of the both are generally same as each other. When the actuator 44 is mounted on the cover 20, the block 250 of the cover 20 can enter into the opening 442 of the actuator 44, and the actuator 44 may move back and forth within an allowable range of the opening 442. Moreover, the first portion 440 disposes a hump 443 on the top thereof. The front structure of the hump 443 is same as the structure of the front sidewall 4140 of the inner concave portion 414 of the rotating member 41, so the hump 443 may be held in the inner concave portion 414 of the rotating member 41. Further, there forms a retaining hole 444 in the hump 443, wherein the numeral 444 can be seen in FIG. 3.

Please refer to FIGS. 2 and 3, the U-shaped connecting member 45 is used to connect the actuator 44 and the rotating member 41. The U-shaped connecting member 45 has a first free edge 450 and a second free edge 451, which are generally parallel to each other. The first free edge 450 is inserted into and is rotatable fixed in the retaining hole 444 of the actuator 44, and the second free edge 451 leans on the rear sidewall 4142 of the inner concave portion 414 of the rotating member 41. In the embodiment, the U-shaped connecting member 45 is a U-shaped ring.

Figure 5:
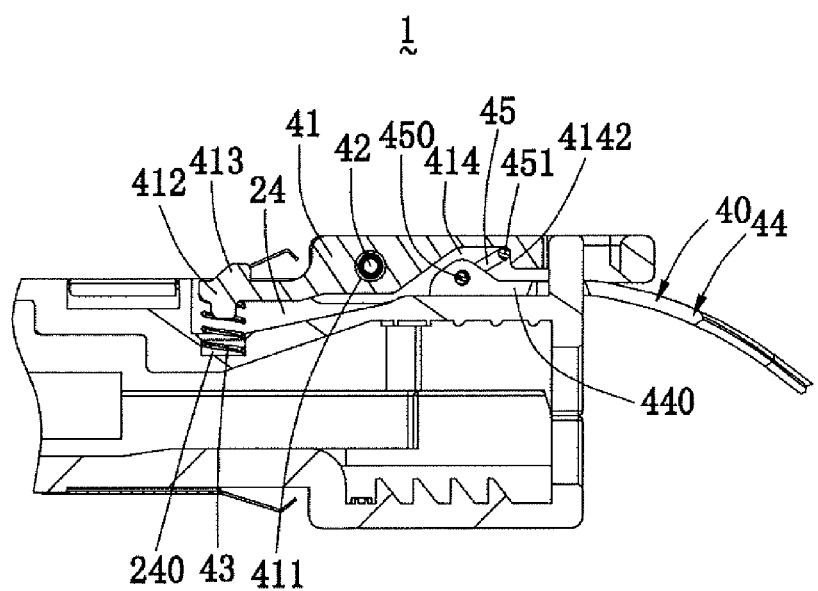
FIG. 5 is a partial section view showing a position relation of every component of the lock and unlocking mechanism.
Figure 6:
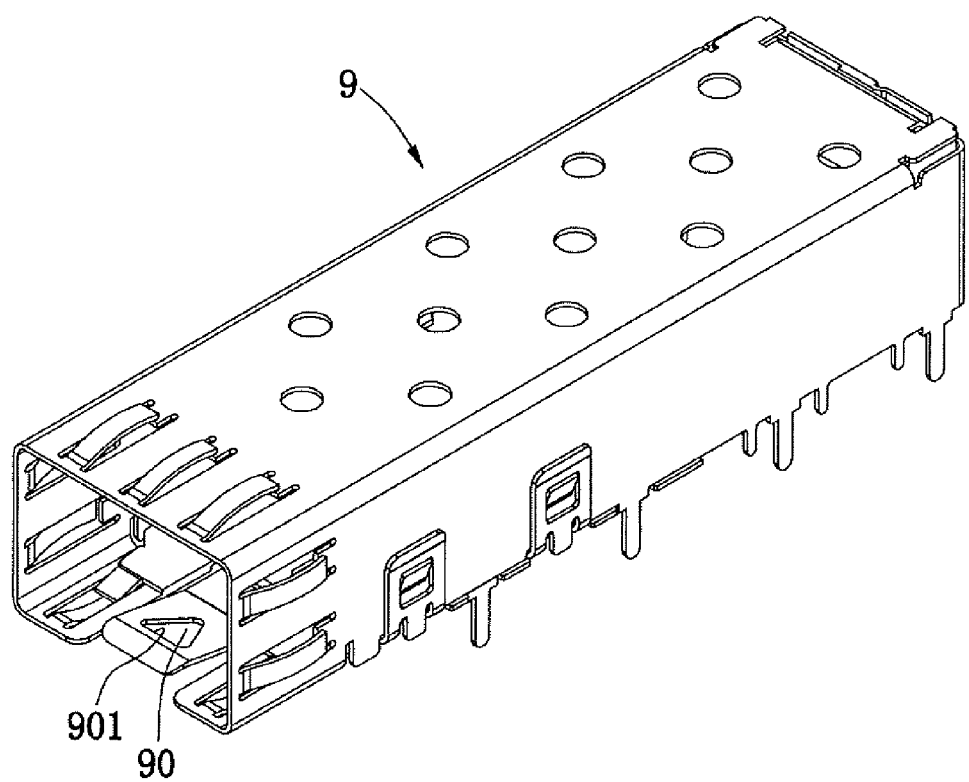
FIG. 6 is a perspective schematic view of a shielding case, which is used to receive the SFP connector of the present invention.

Please refer to FIGS. 5 and 6, in practical use, the SFP connector 1 is inserted into the shielding case 9, and the top surface of the SFP connector 1 faces down. The hook 413 enters into the holding hole 90 of the shielding case 9 and is blocked to move backward by an inner edge 901 of the holding hole 90, thereby preventing the SFP connector 1 from leaving away the shielding case 9. When unlocking, the second portion 441 (seen in FIG. 2) of the actuator 44 may be pulled backward, the first portion 440 and the first free edge 450 of the U-shaped connecting member 45 moves backward together with the second portion 441. Because the second free edge 451 of the U-shaped connecting member 45 can not move backward due to being stopped by the rear sidewall 4142 of the inner concave portion 414, the second free edge 451 can only rotate upward on the first free edge 450, which is used as a pivot, to lift a rear part of the rotating member 41 located in rear of the shaft hole 411, and a front part (such as the latching arm 412) of the rotating member 41 located in front of the shaft hole 411 will rotate downward on the fastening shaft 42, which is used as a pivot. Now, the latching arm 412 can press the spring member 43 downward, the hook 413 may enter into the concave chamber 24 of the cover 20 and withdraw from the holding hole 90 of the shielding case 9, therefore the SFP connector 1 may be pulled out of the shielding case 9. When the SFP connector 1 is pulled out, the locking and unlocking mechanism 40 may return to the initial state under the function of the spring member 43.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A small form-factor pluggable connector, comprising:
a base;
a cover being mounted on the base and having a top surface, which forms a concave chamber and a retaining passage located in rear of the concave chamber; the retaining passage forming a through hole, which is located on two sides of the retaining passage and passes through two sides of the cover; and
a locking and unlocking mechanism including:
a rotating member being rotatable mounted on the cover; the rotating member having a main body received in the retaining passage, a shaft hole formed on the main body and passing through two sides of the main body, a latching arm located in front of the shaft hole and extending forward from a front surface of the main body into the concave chamber, a hook disposed on the top of the latching arm and protruding out of the concave chamber, and an inner concave portion located in rear of the shaft hole and formed on a bottom surface of the main body;
a fastening shaft being inserted into the through hole of the cover and the shaft hole of the rotating member, and the rotating member being pivoted on the cover by the fastening shaft;
a spring member being used to provide an elastic force for locking and unlocking; the spring member being mounted on the concave chamber of the cover and located under the latching arm of the rotating member; when the latching arm being force to rotate downward under an external force, the spring member being compressed; and when the external force being removed, the spring member being restored to an initial state and lifting the latching arm;
an actuator being slideably mounted on the cover and comprising a first portion and a second portion; the first portion being mounted in the retaining passage and being inserted between the main body of the rotating member and the bottom of the retaining passage; and the second portion extending backward from the first portion and being used to pulling the first portion backward; and an U-shaped connecting member being used to connect the actuator and the rotating member; the U-shaped connecting member having two free edges, one free edge of which is rotatable fixed on the first portion of the actuator, and the other free edge of which leans on the inner concave portion of the rotating member.

2. The small form-factor pluggable connector as claimed in claim 1, wherein the retaining passage disposes a block on the bottom of the retaining passage; the main body of the rotating member forms a notch engaged with the block; the first portion of the actuator forms an opening receiving the block; and the length of the block the opening is greater than that of the block.

3. The small form-factor pluggable connector as claimed in claim 1, wherein the top surface of the cover has a first surface in the front thereof and a second surface in the rear thereof; the second surface is higher than the first surface; there forms a shoulder between the first and second surfaces; the concave chamber is formed on the first surface and next to the shoulder; the retaining passage is formed on the second surface and passes through the shoulder and a rear surface of the cover; the bottom of the concave chamber is tilted upward to the bottom of the retaining passage; the through hole is adjacent to the shoulder and is divided into two parts by the retaining passage; and the concave chamber disposes a spring receiving recess on the bottom thereof.

4. The small form-factor pluggable connector as claimed in claim 3, wherein the main body further disposes a protrusion on the bottom of the latching arm; the inner concave portion has a tilted front sidewall and an upright rear sidewall.

5. The small form-factor pluggable connector as claimed in claim 4, wherein the spring member is a cylinder spring, a top end is set on the protrusion of the latching arm, and a bottom end of which is placed in the spring receiving recess.

6. The small form-factor pluggable connector as claimed in claim 4, wherein the first portion disposes a hump on the top thereof; the hump is held in the inner concave portion of the rotating member and forms a retaining hole thereon.

7. The small form-factor pluggable connector as claimed in claim 6, wherein the one free edge of the U-shaped connecting member is rotatable fixed in the retaining hole of the actuator, and the other free edge thereof leans on the rear sidewall of the inner concave portion of the rotating member.

8. The small form-factor pluggable connector as claimed in claim 7, wherein the U-shaped connecting member is a U-shaped ring.

9. The small form-factor pluggable connector as claimed in claim 3, wherein a top surface of the main body is planar, but the bottom surface of the main body is ladder-shaped; when the rotating member is mounted on the cover, the top surface of the main body is align with the second surface of the cover.

10. The small form-factor pluggable connector as claimed in claim 3, wherein the small form-factor pluggable connector further comprises a grounding shell surrounding and being fixed on the base and the cover; the grounding shell is located next to the shoulder, and forms a plurality of elastic pieces being bent outward and extending toward the shoulder on the rear of the grounding shell.

* * * * *